(12) United States Patent
Lewis et al.

(10) Patent No.: US 7,540,268 B2
(45) Date of Patent: Jun. 2, 2009

(54) ENGINE STARTING FOR ENGINE HAVING ADJUSTABLE VALVE OPERATION

(75) Inventors: Donald J. Lewis, Howell, MI (US); John D. Russell, Portland, OR (US)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 11/845,576

(22) Filed: Aug. 27, 2007

(65) Prior Publication Data

US 2008/0047517 A1 Feb. 28, 2008

Related U.S. Application Data

(63) Continuation of application No. 11/128,663, filed on May 12, 2005, now Pat. No. 7,278,388.

(51) Int. Cl.
*F02N 17/08* (2006.01)
(52) U.S. Cl. .................. 123/179.5; 123/179.16
(58) Field of Classification Search ... 123/179.1–179.5, 123/179.16
See application file for complete search history.

(56) References Cited

U.S. PATENT DOCUMENTS

| | | | |
|---|---|---|---|
| 4,009,695 A | 3/1977 | Ule | |
| 4,462,348 A | 7/1984 | Giardini | |
| 4,489,685 A | 12/1984 | Kinoshita et al. | |
| 5,597,371 A | 1/1997 | Toukura | |
| 5,687,682 A | 11/1997 | Rembold et al. | |
| 6,050,231 A | 4/2000 | Tisch et al. | |
| 6,098,585 A | 8/2000 | Brehob et al. | |
| 6,202,615 B1 | 3/2001 | Pels et al. | |
| 6,237,546 B1 | 5/2001 | Gander | |
| 6,431,129 B1 | 8/2002 | Hammoud et al. | |
| 6,431,154 B1 | 8/2002 | Inoue | |
| 6,588,397 B1 | 7/2003 | Sieber | |
| 6,681,173 B2 | 1/2004 | Turner et al. | |
| 6,718,928 B2 | 4/2004 | Brueggen et al. | |
| 6,754,578 B1 | 6/2004 | Bidner et al. | |
| 6,799,547 B2 | 10/2004 | Sieber | |
| 6,807,934 B2 | 10/2004 | Kataoka et al. | |
| 6,834,632 B2 | 12/2004 | Kataoka et al. | |
| 6,981,481 B2 | 1/2006 | Kojima et al. | |
| 7,082,899 B2 | 8/2006 | Hanson et al. | |
| 7,096,840 B2 | 8/2006 | Asada et al. | |
| 7,104,235 B2 * | 9/2006 | Brehob et al. ............. | 123/179.5 |
| 2002/0166531 A1 | 11/2002 | Ackermann et al. | |

* cited by examiner

*Primary Examiner*—Stephen K Cronin
*Assistant Examiner*—Arnold Castro
(74) *Attorney, Agent, or Firm*—Allan J. Lippa; Alleman Hall McCoy Russell & Tuttle LLP

(57) ABSTRACT

A method for controlling an engine having at least two cylinders, at least one of which having at least an adjustable valve, the method comprising before engine rotation closing electrically actuated valves in at least a first and a second cylinder; fueling at least said first cylinder with a first fuel amount and said second cylinder with a second fuel amount; and performing a first spark in at least one of said first cylinder and said second cylinder; and after engine rotation, firing each cylinder of the engine in a sequential firing order without changing a number of strokes in any cylinder of the engine.

8 Claims, 8 Drawing Sheets

ENGINE STARTING FOR ENGINE HAVING ADJUSTABLE VALVE OPERATION

The present application is a continuation of U.S. patent application Ser. No. 11/128,663, titled "Engine Starting for Engine having Adjustable Valve Operation", filed May 12, 2005, the entire contents of which are incorporated herein by reference.

FIELD

The present description relates to a method for improving a shut-down of an internal combustion engine and more particularly to a method for controlling electromechanical intake and/or exhaust valves to improve shut-down and re-starting of an internal combustion engine.

BACKGROUND AND SUMMARY

Engine cylinders for passenger vehicles may have one or more electrically actuated intake and or exhaust valves. These electrically actuated valves can operate independently of a crankshaft and/or piston position, for example. Various modes of operating these valves may be provided for improving engine control and/or emission reduction.

One approach adjusts relative valve cycles to fire multiple cylinders simultaneously to improve starting. Then, after a predetermined number of working cycles, the simultaneous actuation is terminated. Such an approach is described in U.S. Pat. No. 6,050,231.

However, the inventors herein have recognized a disadvantage with such an approach. For example, while U.S. Pat. No. 6,050,231 may provide increased starting torque for one or more cycles, the engine will be operating in unusual firing order. Further, there is a potential for increased emissions and/or increased torque fluctuations when discontinuing this unusual firing order. This may result in significant customer dissatisfaction or increased catalyst cost to compensate for the excess emissions. Further, the approach of U.S. Pat. No. 6,050,231 is described for a specific piston starting position, which may not always be available. Finally, in the approach of U.S. Pat. No. 6,050,231, there still may be insufficient torque under some conditions.

In one approach, at least some of the above disadvantages, or other disadvantages, may be achieved by a method for controlling an engine having at least two cylinders, at least one of which having at least an adjustable valve, the method comprising: before engine rotation: closing electrically actuated valves in at least a first and a second cylinder; fueling at least said first cylinder with a first fuel amount and said second cylinder with a second fuel amount; and performing a first spark in at least one of said first cylinder and said second cylinder; and after engine rotation, firing each cylinder of the engine in a sequential firing order without changing a number of strokes in any cylinder of the engine.

In this way, it may be possible to obtain increased starting torque without needing to change combustion order to return to a normal firing order (although such a change may be used, if desired).

In another approach, at least some of the above disadvantages, or other disadvantages, may be achieved by a method for controlling an engine with a cylinder having at least an adjustable valve, the method comprising: during engine starting from rest, varying at least one of valve closing or opening as a starting piston position of the cylinder varies to trap an amount of fresh charge in the cylinder; injecting a fuel amount to match said fresh charge amount; and performing a spark event in the cylinder to generate a first combustion event in the engine and ignite said fresh charge and fuel. In this way, it may be possible to improve starting where the initial piston position may vary from start to start.

In still another approach, at least some of the above disadvantages, or other disadvantages, may be achieved by a method for controlling an engine having at least two cylinders, at least one of which having at least an adjustable valve, the method comprising: during engine starting: closing electrically actuated valves in at least a first and a second cylinder; opening at least one electrically actuated valve in a third cylinder; directly injecting fuel into at least said first cylinder with a first fuel amount and said second cylinder with a second fuel amount; and performing a spark in at least one of said first cylinder and said second cylinder. In this way, a further reduction in pumping torque on cylinders other than those firing initially may be achieved while still increasing starting torque.

DETAILED DESCRIPTION

Figure 1:
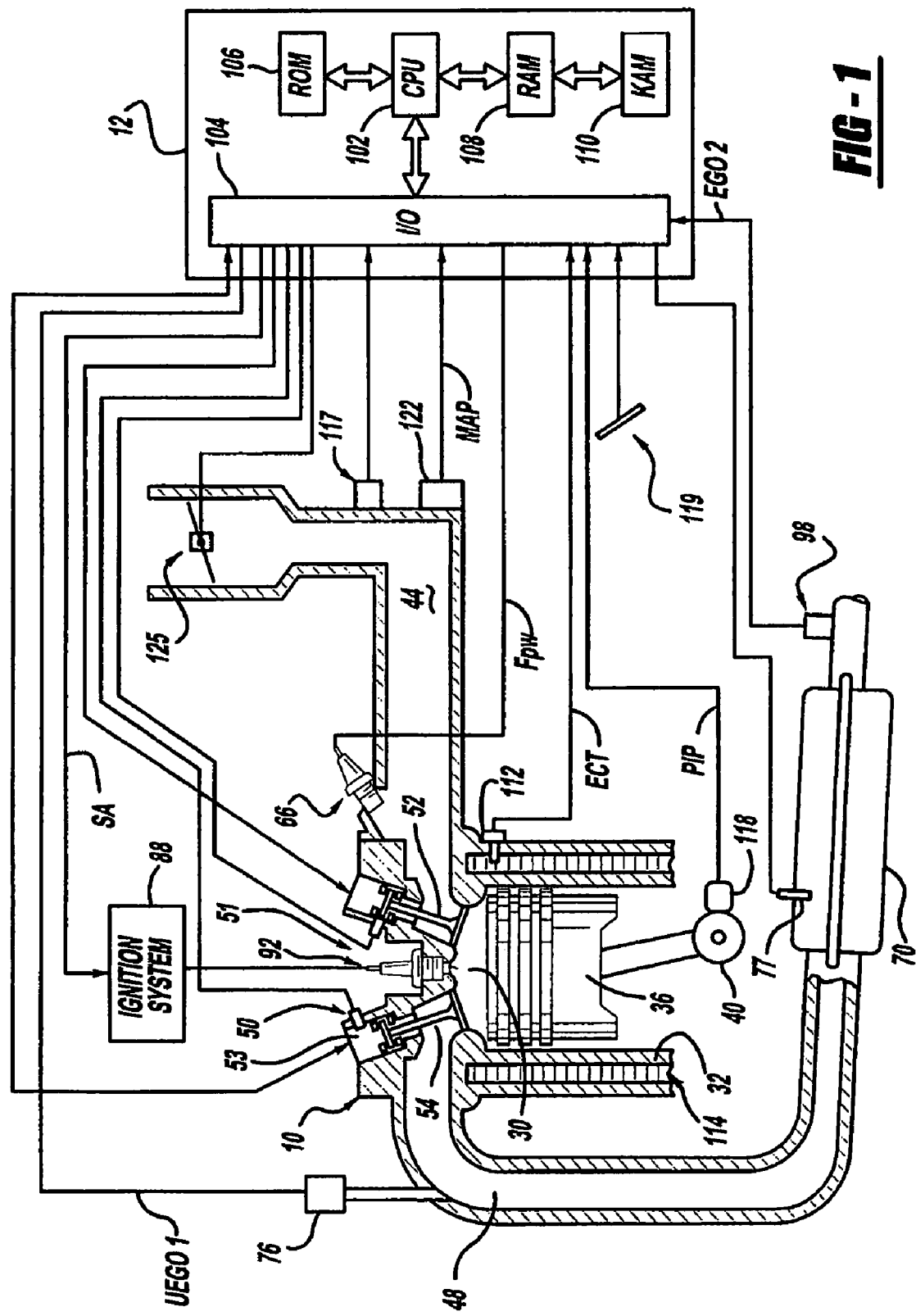
FIG. 1 is a schematic diagram of an engine.
Figure 1A:
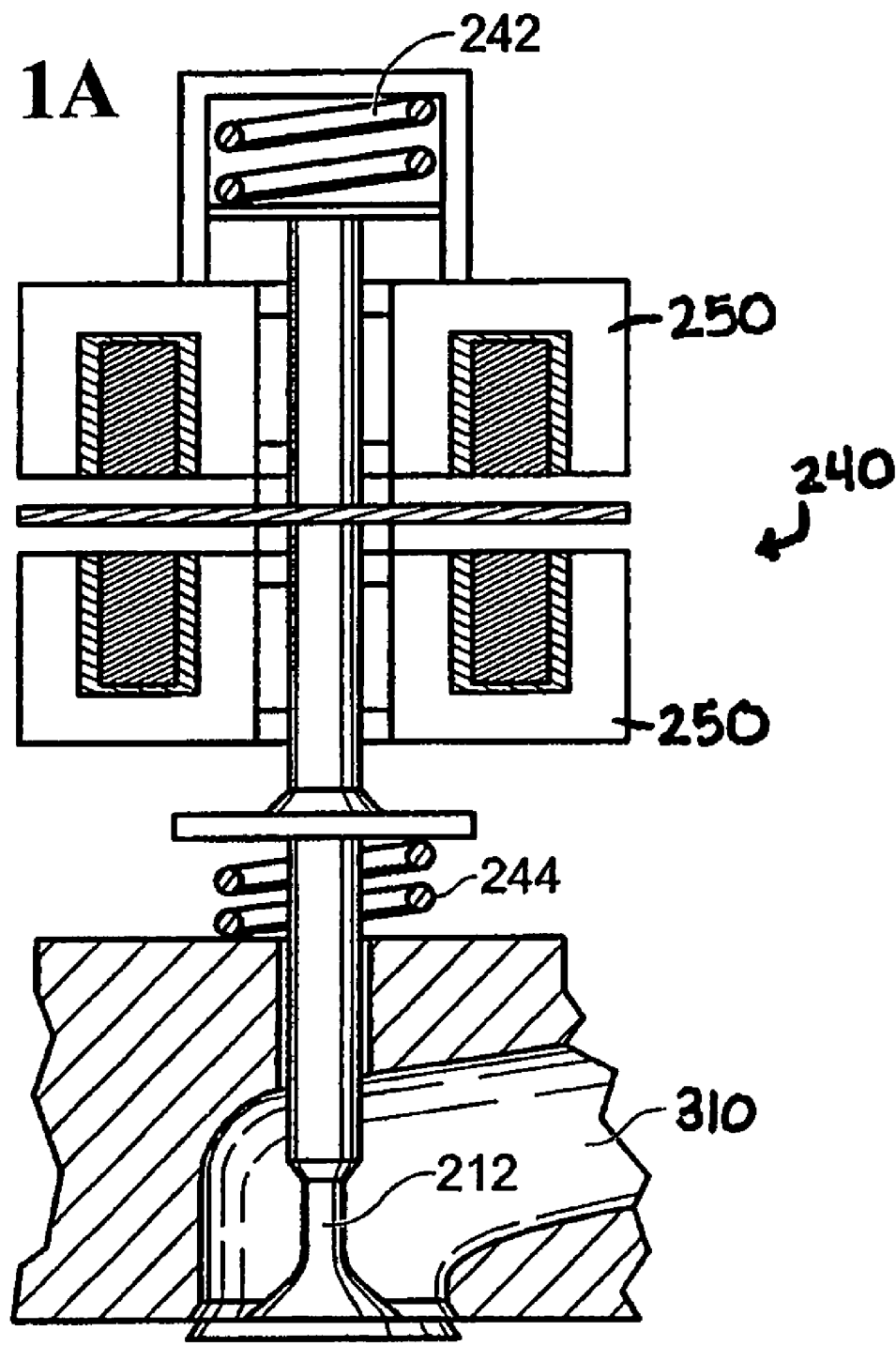
FIG. 1A is a schematic diagram of an engine valve.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 an exhaust valve 54. Each intake and exhaust valve is operated by an electromechanically controlled valve coil and armature assembly 53, such as shown in FIG. 1A. Armature temperature is determined by temperature sensor 51. Valve position is determined by position sensor 50. In an alternative example, each of valves actuators for valves 52 and 54 has a position sensor and a temperature sensor. In still another alternative, one or more of intake valve 52 and/or exhaust valve 54 may be cam actuated, and be capable of mechanical deactivation. For example, lifters may include deactivation mechanism for push-rod type cam actuated valves. Alternatively, deactivators in an overhead cam may be used, such as by switching to a zero-lift cam profile.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only memory 106, random access memory 108, 110 keep alive memory, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

In an alternative embodiment, a direct injection type engine can be used where injector 66 is positioned in combustion chamber 30, either in the cylinder head similar to spark plug 92, or on the side of the combustion chamber. Also, the engine may be coupled to an electric motor/battery system in a hybrid vehicle. The hybrid vehicle may have a parallel configuration, series configuration, or variation or combinations thereof.

While not shown in FIG. 1, an optional starter motor/alternator assembly may be coupled to the engine via crankshaft 40. The engine starter motor may be of reduced size if used in combination with various of the self-starting engine routines described below. Alternatively, no starter motor may be used. For example, in one example, the engine may have a starter motor, yet utilized direct cylinder starting if the battery power has reduced to a value where the motor cannot rotate the engine sufficiently, but yet has sufficient power to actuator the fuel injectors and electric valves. Also, engine pre-positioning may be used where engine position is controlled during a previous shut-down to position the engine in a desired location that improves self-starting.

FIG. 1A shows an example dual coil oscillating mass actuator 240 with an engine valve actuated by a pair of opposing electromagnets (solenoids) 250, 252, which are designed to overcome the force of a pair of opposing valve springs 242 and 244. FIG. 1A also shows port 310, which can be an intake or exhaust port). Applying a variable voltage to the electromagnet's coil induces current to flow, which controls the force produced by each electromagnet. Due to the design illustrated, each electromagnet that makes up an actuator can only produce force in one direction, independent of the polarity of the current in its coil. High performance control and efficient generation of the required variable voltage can therefore be achieved by using a switch-mode power electronic converter. Alternatively, electromagnets with permanent magnets may be used that can be attracted or repelled.

As illustrated above, the electromechanically actuated valves in the engine remain in the half open position when the actuators are de-energized. Therefore, prior to engine combustion operation, each valve goes through an initialization cycle. During the initialization period, the actuators are pulsed with current, in a prescribed manner, in order to establish the valves in the fully closed or fully open position, if desired. Following this initialization, the valves are sequentially (or non-sequentially) actuated according to the desired valve timing (and firing order) by the pair of electromagnets, one for pulling the valve open (lower) and the other for pulling the valve closed (upper).

The magnetic properties of each electromagnet are such that only a single electromagnet (upper or lower) need be energized at any time. Since the upper electromagnets hold the valves closed for the majority of each engine cycle, they are operated for a much higher percentage of time than that of the lower electromagnets.

While FIG. 1A appears show the valves to be permanently attached to the actuators, in practice there can be a gap to accommodate lash and valve thermal expansion.

As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the disclosure, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

Figure 2:
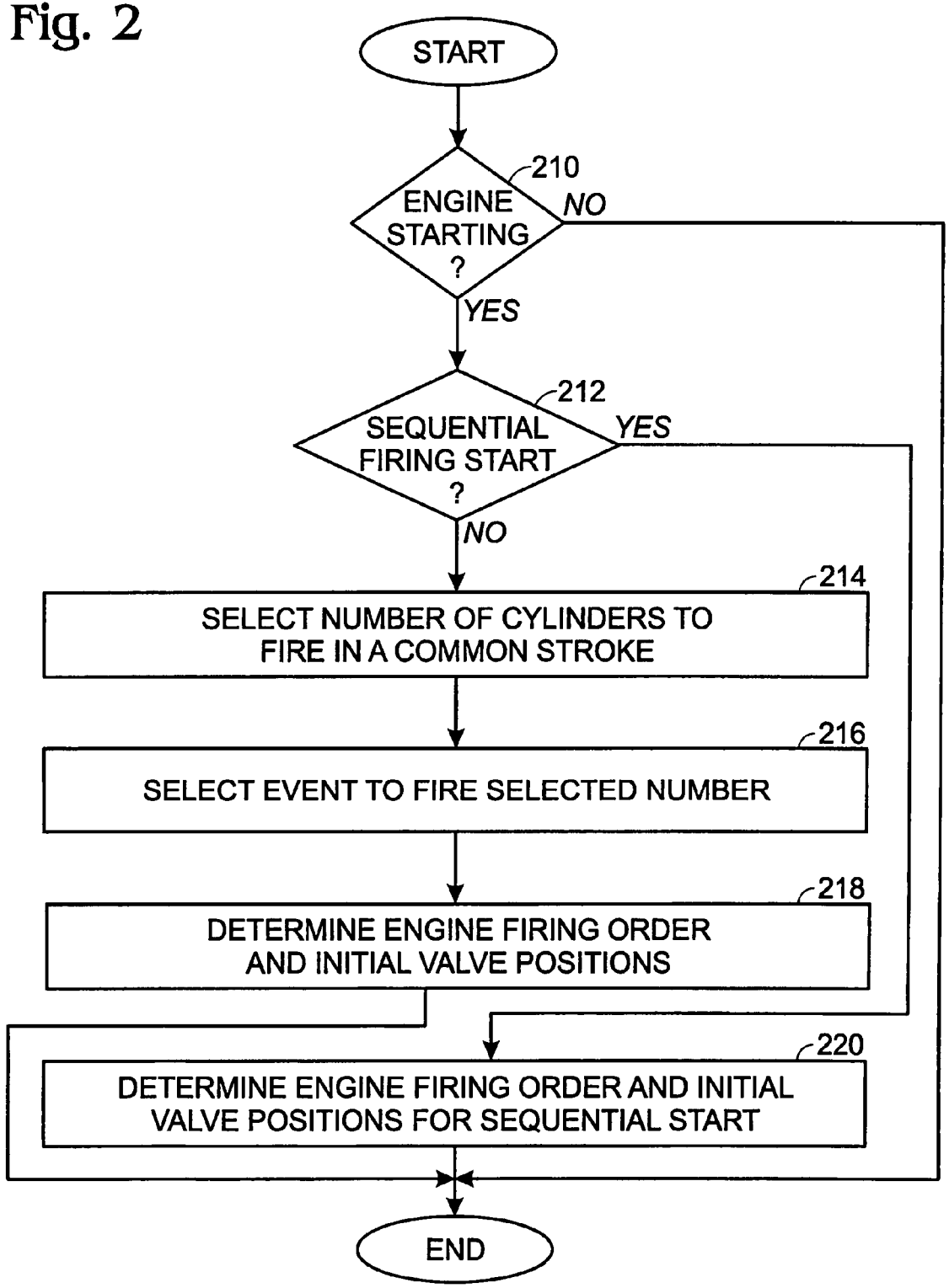
FIGS. 2-4 are flowcharts of various methods to control valve timing before, during, and after starting engine and/or cylinder combustion.
Figure 3:
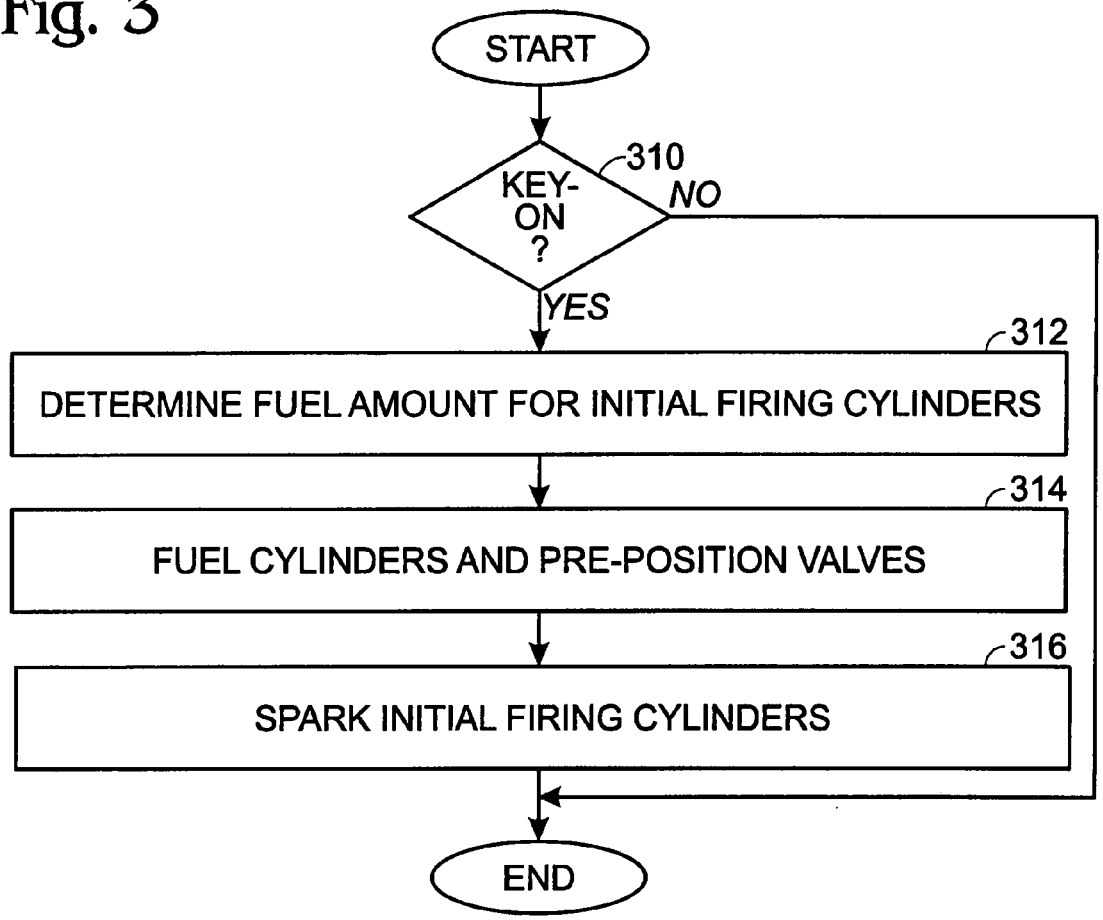
Figure 4:
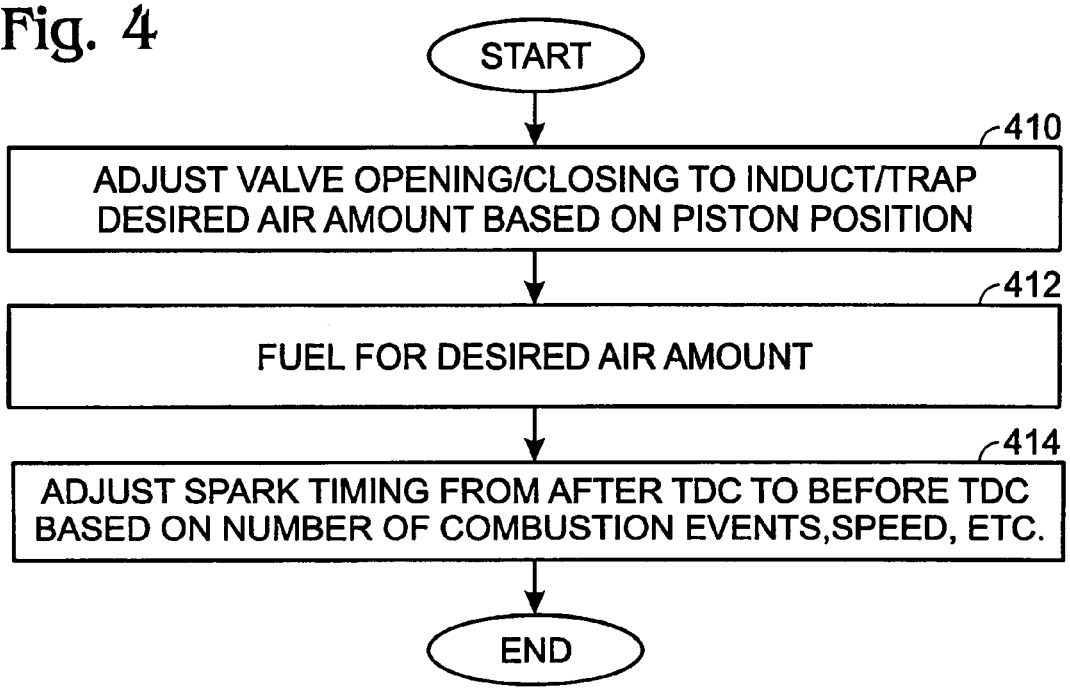

Referring now to FIGS. 2-4, various routines are described for controlling an engine starting. The features described below may be used alone or in combination with other features described herein. The starting may be a vehicle start (such as key-on), an engine start or re-start such as in a hybrid powertrain, or a partial engine start (e.g., one or more cylinder starting or re-starting). Specifically, on one example, a method is described that performs self-starting of engine with electric valves where one or more cylinders fires outside its normal firing order during the start. Then, once a certain speed is reached, or a certain number of firings have occurred, one or more cylinders is operated with a combustion cycle having more or less strokes so that all of the cylinders in the engine fire in the normal firing order. Further, the amount of fuel used during the first firing direct start cylinders may be adjusted based on the piston position (which defines the initial amount of air). Also, spark timing for the initial direct starting cylinder(s) may be adjusted to be after top dead center (TDC) so that the engine rotates in a desired direction, whereas later combustion may occur with spark timing before top dead center (TDC), e.g., −10 degrees.

Referring now, specifically to FIG. 2, in step 210, the routine determines whether a starting condition has occurred. The engine starting condition may be an engine starting from stop, engine re-starting (from rest or with the engine already under rotation), a cylinder starting, etc. If so, the routine continues to step 212 to select a sequential or non-sequential firing start. If a sequential start is selected, the routine continues to step 220 to determine a firing order and initial valve positions for the start. As described herein, various valve settings may be used depending on whether trapped gas is used, or inducted gas, for the first and subsequent firing.

Further, valves may be set open to reduce pumping work, while still avoiding pushing fresh air to the exhaust. In one example, intake valves are held open to reduce any disturbance to the exhaust composition.

One example of a sequential start is where each cylinder operates with valve timings in its respective cycle (e.g., 4-cycle) at a given firing order. For example, for a 4-cylinder engine, one example is 1-3-4-2. The selection of step 212 may be based on various parameters, such as, for example, whether starter assist is provided for the start, engine temperature, exterior temperature, engine off time, and/or others.

Alternatively, if non-sequential starting is selected, the routine continues to step 214. In step 214, the routine selects a number of cylinders to fire in a common stroke. This selection vary as various parameters vary, such as, for example, the number of cylinders in the engine, whether the common stroke firing occurs during a first combustion event, or subsequent combustion events, engine temperature, ambient temperature, and/or others.

Note that firing in a common stroke may include sparking two cylinders with pistons in identical positions simultaneously, or performing the spark at different locations. For example, a first spark may occur before a second (and/or third) spark for cylinders with pistons in the same, or substantially the same, position. Such operation may have the effect of operating one or more cylinders in a different firing order during the start, when compared with the firing order under other operating conditions. For example, in a 4-cylinder engine, the firing order for combustion during running conditions may be 1-3-4-2. However, during starting where non-sequential starting is selected, the firing order may be 1&4-3-x-2, where (x) represents no firing where one would otherwise occur, and 1&4 indicates that cylinders 1 and 4 fire in the same stroke (which may or may not be simultaneous). In another example, where non-sequential starting is selected, the firing order may be 1-3&2-x-4.

Then, in step 216, the routine selects an event to perform the selected non-sequential combustion. For example, it may be the first combustion even, later combustion events, or both. As one example for a 4-cylinder engine that normally fires 1-3-4-2, the following may occur: 1&4*-3-x-2-1&4-3-x-2, where * represents the first firing of the engine (e.g., starting from rest, or re-starting at a given speed). Alternatively, only a single common stroke firing may be used. In still another example, the common stroke firing may occur after the first firing, such as in the example firing of: 2-1&4-3-x-2-1&4*-3-x. Further still, various other combinations may be used.

Next, in step 218, the routine determines the engine firing order and initial valve positions given the selected event and number of cylinders firing in a common stroke. The initial valve positions may be selected to provide a desired amount of cylinder charge for the initial firings, or may be set to reduce pumping work. Further, the valves may be set to use trapped air or inducted air for the initial and subsequent firings. For example, as shown in the examples below, various valve settings may be used depending on the starting conditions, such as engine temperature, number of cylinders, and/or others. Then, the routine ends and during non-sequential starting the routines of FIGS. 3-4 are performed.

Referring now to FIG. 3, in step 310 the routine determines whether a key-on condition occurs as one approach to identifying an engine start from rest. However, various other engine and/or cylinder starts may be used as described herein. Then, when conditions are identified indicating starting, the routine continues to step 312 to determine a fuel amount for the initially firing cylinders. In one example, this fuel amount can be based on the engine piston starting positions for the respective cylinders. For example, if two cylinders are both going to fire during a common stroke from rest, then the amount of fuel to be injected can be based at least in part on the piston positions of the respective cylinders, along with other factors, such as, for example, engine temperature, air temperature, barometric pressure, etc. As shown below, fuel injection for cylinder performing a first combustion (or later combustions) may occur at or before engine rotation begins, at least some of the injected fuel.

Next, in step 314, the routine fuels the cylinders and pre-positions the valves to the valve settings determine in step 218 (see also FIG. 4 below). Then, in step 316, the routine sparks the initial firing cylinders to perform a direct start of the engine. In an alternative embodiment, direct starting can be used in combination with a starter motor to provide faster engine starting.

Referring now to FIG. 4, in step 410 the routine adjusts valve opening/closing/lift to induct/trap a desired air amount. For example, valves may be closed before or at the beginning of engine rotation trapping an initial air amount defined by atmospheric conditions and piston position. Further, the valves may be held open and closed after some upward (or downward) piston movement to trap a desired amount of air also defined by atmospheric conditions and piston position rather than relying on an induction stroke to fill the cylinder. Then, in step 412 the routine fuels for the air in the cylinder, and then adjusts spark timing in step 414 based on factors such as the number of combustion events, temperature, and/or others.

Note that in one embodiment, (see FIG. 5 below as one example), spark timing during the initial firing cylinders from rest may be after TDC (to promote rotation in a desired direction), and then spark timing is gradually (or abruptly) moved back to before TDC in later combustion events.

The above approach can be applied to various types of engines and can be adjusted to take into account firing order, firing intervals, number of cylinders, etc. For example, it may be used with 2, 4, 6, or more cycle engines, V-type engines, in-line engines, opposed engines, W-type engines, or others. Further, it may be used with engines having 2, 3, 4, 6, 8, or more cylinders, and even may be used in engines where no two cylinders have a piston in the same relative position. In particular, as the number of cylinders increases, it may be possible to provide more than one initial combustion event to start the engine from rest, and further in such conditions, increasing (or decreasing) the number of strokes to return to a desired firing order can be done simultaneously in more than one cylinder, or the cylinders can be gradually 2-stroked (or 6-stroked, etc.) to spread any torque disturbance out over longer intervals to reduce any vehicle or engine vibration. Further, as the firing order changes, various adjustments can be made to which cylinder has the number of strokes changed and how such a transition occurs. Various examples are described in more detail in the Figures below.

Figure 5:
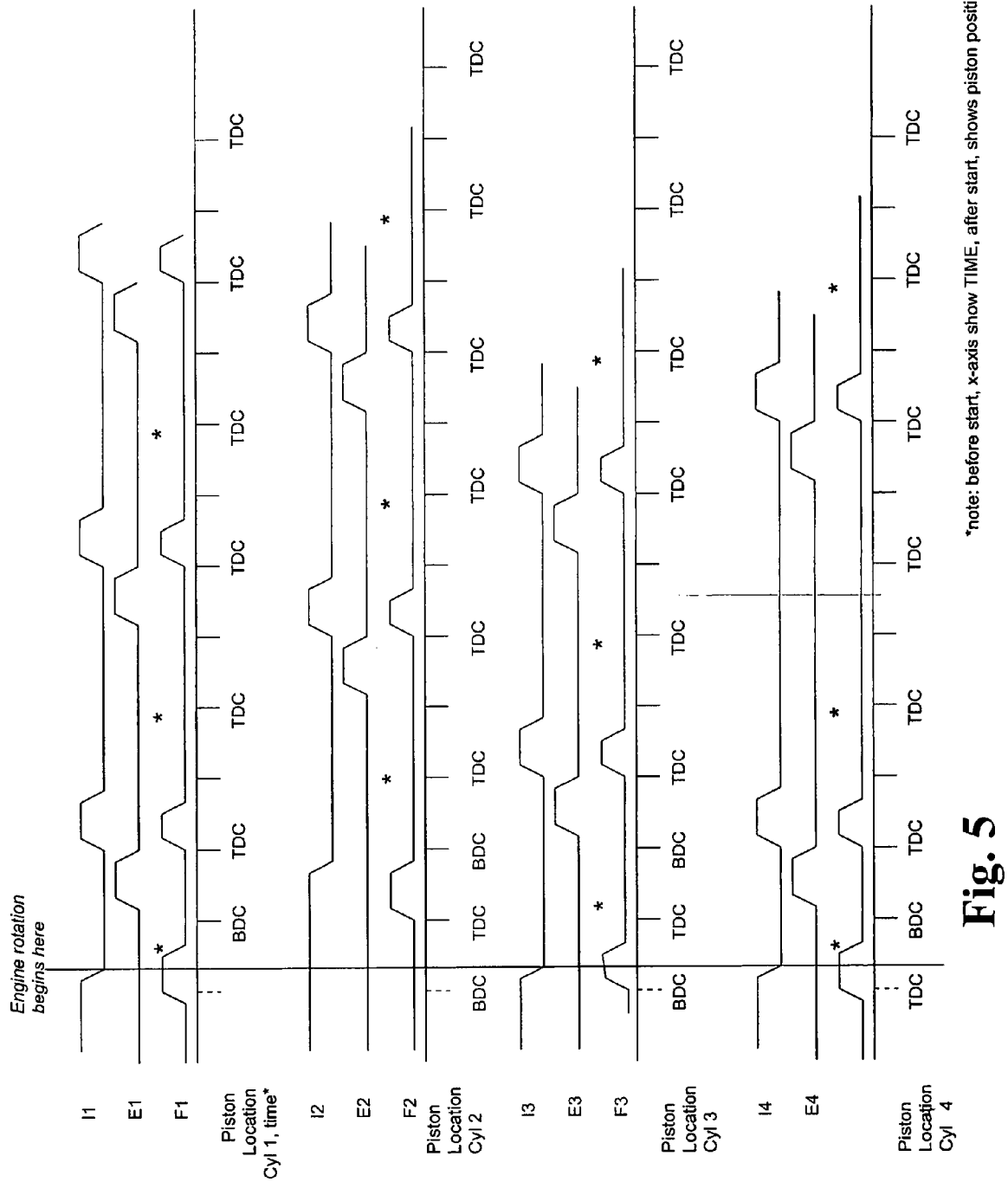
FIGS. 5-8 are plots of example valve timing during engine starting.

FIG. 5 shows an example starting sequence for a direct injection 14 4-cycle engine starting with 2 cylinders firing simultaneously in a common stroke (cylinders 1 and 4), and then 6-stroke cycle operation is used (note that 2-stroke operation could also have been used, if desired). The graphs show approximate trajectories of an intake valve for each of cylinders 1 to 4 (I1, I2, . . . I4); an exhaust valve for each of cylinders 1 to 4 (E1, E2, . . . E4); and a fuel injector for each of cylinders 1 to 4 (F1, F2, . . . F4) for a given crank angle. However, note that before engine rotation, the graph is shown over time, whereas after rotation begins, the graph is shown as a function of crank angle. Also, ignition timing is shown with an asterisk (*), where appropriate.

Specifically, in this example, cylinders 1 and 4 fire simultaneously to start the engine, and engine cylinder 4 performs 6-stroke operation to obtain a firing order of 1-3-4-2. Also, Cylinder 3 is operated to trap its initial air amount so that it can perform combustion without waiting for an intake stroke (i.e., unlike cylinder 2 which uses an induction cycle). Note that, as described above, the timing of the closing of the intake valve could be delayed until after rotation begins to trap a smaller amount of air in the cylinder. While this may provide less torque when it is combusted, it also may reduce required starting torque by requiring less compression force. In one example, the timing for the closing of the intake (and/or exhaust) valve may be adjusted to provide a minimum amount of air for reliable combustion, but less than a maximum amount of air that would require to great a compression force.

In an alternative embodiment, each of cylinders 1, 2, and 3 could be operated with 6 strokes (or 2 strokes), and cylinder 4 left in its cycle, to eventually obtain a firing order of 1-3-4-2. Further, combinations of 2-stroke operation on some cylinders and 6-stroke operation on others could also have been used.

The figure shows an intake and exhaust valve timing, along with fuel injection, relative to engine position (once rotation begins). However, more than one intake and/or exhaust valve may also be used, if desired.

In one example, if desired, in the event there is a variation in engine torque due to the increase or decrease in the number of strokes, it may be compensated for in various ways. For example, the amount of air charge in the cylinder changing the number of strokes (and/or the amount of air charge in other cylinders in the engine) can be adjusted (e.g., by adjusting valve opening and/or closing timing) to account for the torque variation. Also, in the alternative or in addition, ignition timing may also be adjusted to compensate for the torque disturbance.

Figure 6:
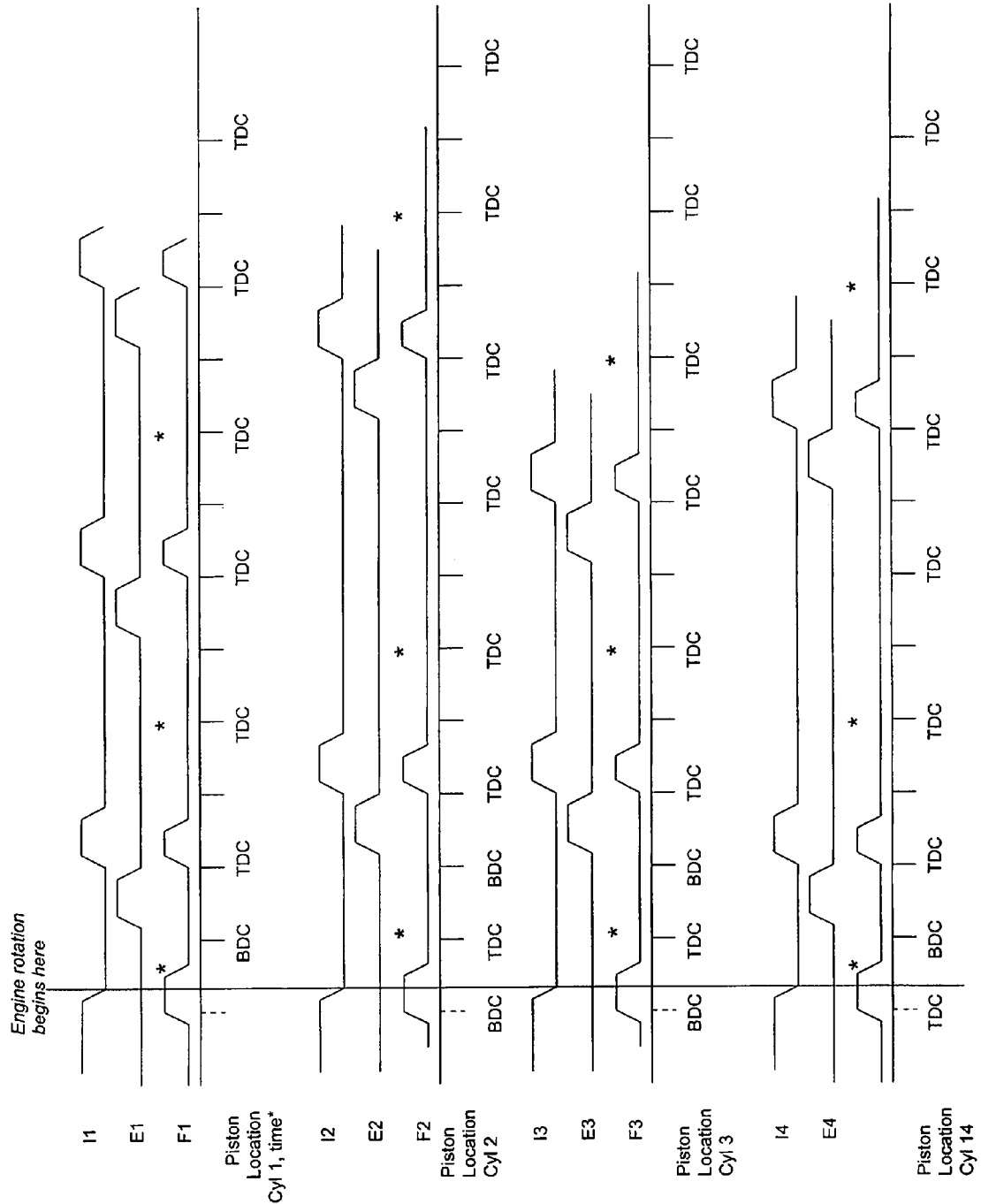

FIG. 6 shows a modification of the example of FIG. 5, where two sets of cylinders operate to perform combustion in a common stroke. Specifically, FIGS. 1 and 4 fire in a common stroke, and then cylinders 2 and 3 fire in a common stroke. Then, this repeats for another firing in each cylinder until a 6-stroke cycle is used in each of cylinders 2-4 to obtain an eventual firing order of 1-3-4-2.

Figure 7:
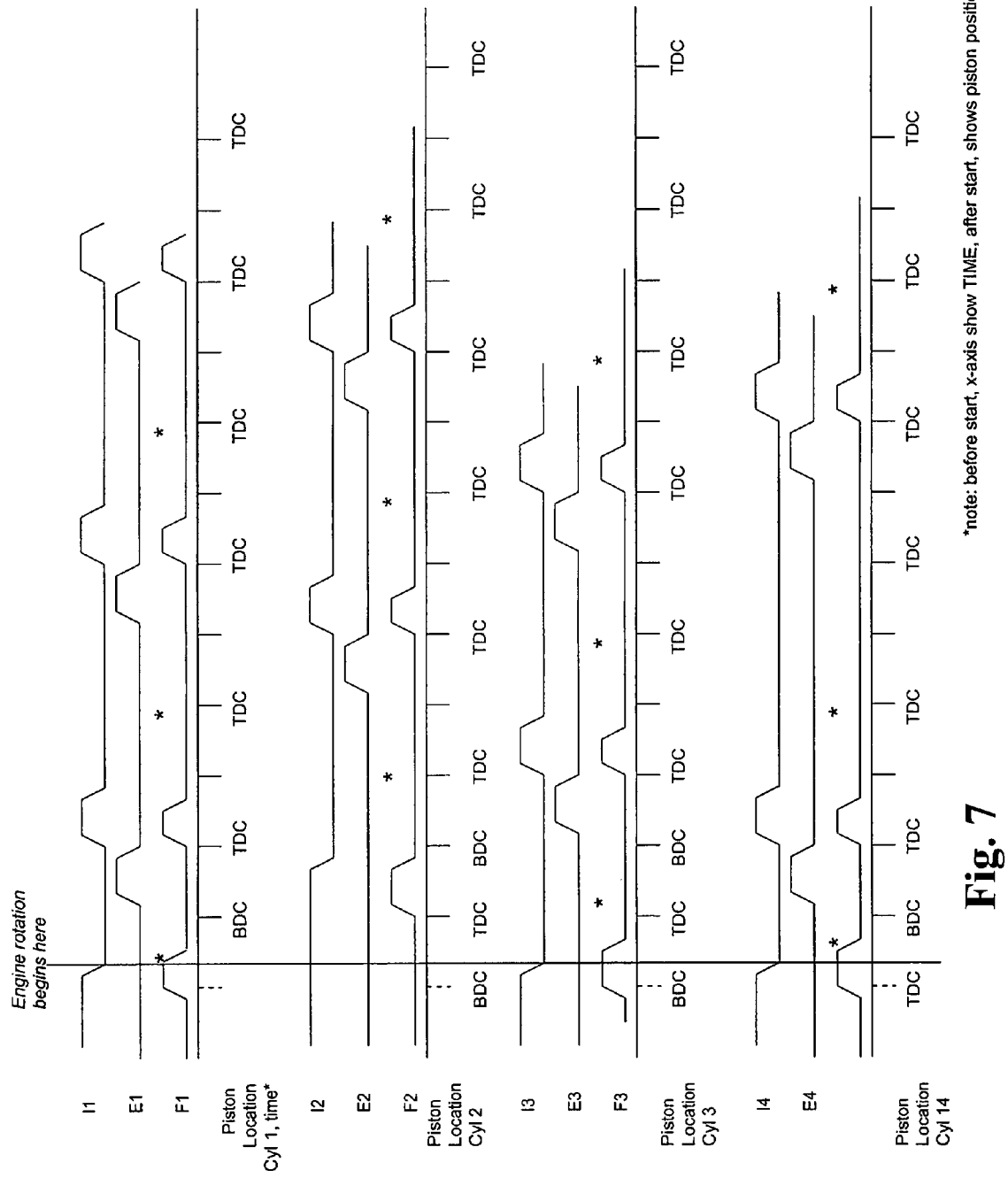

FIG. 7 show still another modification of the example of FIG. 5, where spark timing is adjusted for later combustion events to before TDC.

Figure 8:
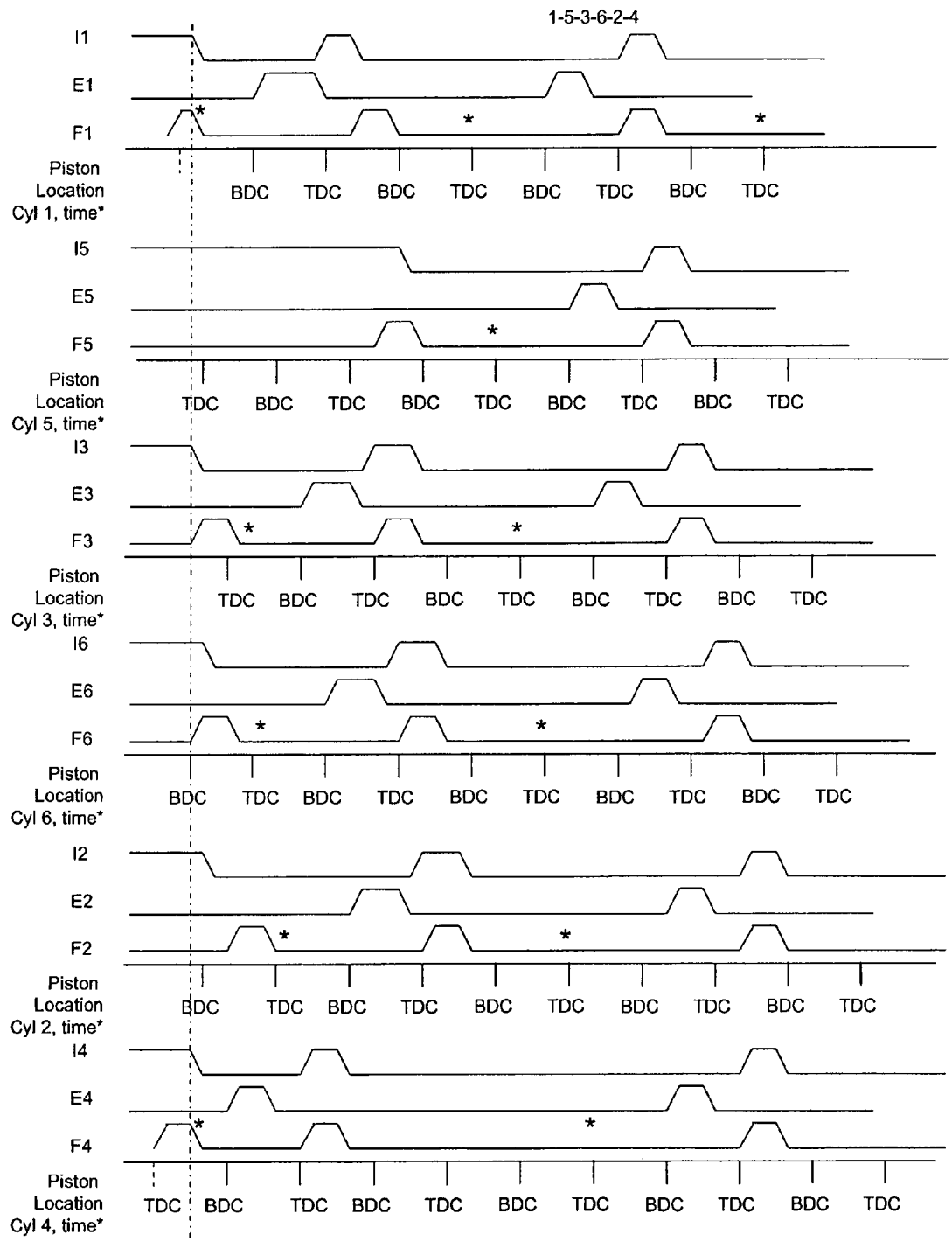

Referring now to FIG. 8, an example is shown for a six cylinder engine, which may be applicable to both inline and V-type six cylinder four cycle engines. In this example, the firing order is 1-5-3-6-2-4, however during the start, cylinders 1 and 6 fire in a common stroke. Further, in an alternative, less fuel may be injected for cylinder 1 than cylinder 6, and the ignition timing may be different between the two. Thus, while simultaneous combustion in a common stroke is shown for cylinders 1 and 6, staggered timing may also be used. Also, alternative combustion orders may be used, such as, for example, 1-2-5-6-4-3 and 1-4-5-6-2-3.

In this example, both cylinders 6 and 4 operated with an increased number of strokes in a combustion cycle to obtain the desired firing order after starting. However, in an alternative, cylinder 6 could skip the first firing shown and operate with one of the intake and exhaust valves held open until the second firing shown.

Also, the increased number of strokes may be carried out in various ways. For example, the solid line shown for cylinder number 4 provides double compression and double expansion of unburned gasses, while the dashed line results in double compress/expansion of burned gasses. Either approach may be used, along with various others. For example, one or more of double compression, double intake, and/or double exhaust before induction may be used.

Also, fueling for cylinder 1 (for the second and/or subsequent fuelings) could overlap induction to improve atomization. While the example of FIG. 8 shows cylinders where the exhaust and/or intake valves are held open until a desired amount of air in the cylinder is obtained, then fuel can be injected and fired. Further, the timing of the exhaust and/or intake valve(s) can be used to control air for firing events. In some cases, the first combustion event air amount may be a partial charge instead of a full charge (see, e.g., cylinders 1 and 6) or alternatively may have extended valve timing to obtain a larger amount of air for the first combustion event (compared to nominal valve timing, see e.g., cylinder 5). The variable air charge amount can be based on engine and/or air charge temperatures, in one example. Further, negative valve overlap may be used during starting and/or idle speed, if desired.

Note that the above approaches can be combined with engine starting approaches that further reduce flow through the exhaust system. For example, one or more intake and/or exhaust valves can be held closed for one or more cycles during engine starting and/or cranking. For example, exhaust valves may be held closed until a first combustion event in the cylinder.

It will be appreciated that the configurations and routines disclosed herein are exemplary in nature, and that these specific embodiments are not to be considered in a limiting sense, because numerous variations are possible. For example, the above approaches can be applied to V-6, I-4, I-6, V-12, opposed 4, and other engine types. Also, the approaches described above are not specifically limited to a dual coil valve actuator. Rather, it could be applied to other forms of actuators, including ones that have only a single coil per valve actuator, and/or other variable valve timing systems, such as, for example, cam phasing, cam profile switching, variable rocker ratio, etc.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for controlling an engine including at least a first cylinder having a first piston and a second cylinder having a second piston, at least one of said first and second cylinders having at least an adjustable valve, the method comprising:

before engine rotation:
closing electrically actuated valves in at least the first and the second cylinder;
fueling at least said first cylinder with a first fuel amount based on a position of the first piston and said second cylinder with a second fuel amount based on a position of the second piston, wherein said first fuel amount is different from said second fuel amount where the position of the first piston relative to the first cylinder is different from the position of the second piston relative to the second cylinder; and performing a first spark in at least one of said first cylinder and said second cylinder; and after engine rotation, firing each cylinder of the engine in a sequential firing order without changing a number of strokes in any cylinder of the engine.

2. The method of claim 1 wherein a second spark is performed in the other of said first and second cylinder before engine rotation to start the engine.

3. The method of claim 2 wherein said first spark is performed with the first piston after top dead center and wherein said second spark is performed with the second piston after top dead center.

4. The method of claim 1 wherein said first fuel amount is the same as said second fuel amount where the position of the first piston relative to the first cylinder is substantially the same as the position of the second piston relative to the second cylinder.

5. The method of claim 1 wherein said first fuel amount is greater than said second fuel amount where a first volume defined by the position of said first piston and said first cylinder is greater than a second volume defined by the position of said second piston and said second cylinder.

6. A method for controlling an engine including at least a first cylinder having a first piston and a second cylinder having a second piston, at least one of said first and second cylinders having at least an adjustable valve, the method comprising:

before engine rotation:
closing electrically actuated valves in at least the first and the second cylinder;
fueling at least said first cylinder with a first fuel amount based on a position of the first piston and said second cylinder with a second fuel amount based on a position of the second piston;
performing a first spark in said first cylinder and a second spark in said second cylinder to initiate rotation of the engine; and
after engine rotation, firing each cylinder of the engine in a sequential firing order without changing a number of strokes in any cylinder of the engine,
wherein said first fuel amount is different from said second fuel amount where the position of the first piston relative to the first cylinder is different from the position of the second piston relative to the second cylinder.

7. The method of claim 6 wherein said first spark is performed with the first piston after top dead center and wherein said second spark is performed with the second piston after top dead center.

8. The method of claim 7 wherein said first fuel amount is greater than said second fuel amount where a first volume defined by the position of said first piston and said first cylinder is greater than a second volume defined by the position of said second piston and said second cylinder.

\* \* \* \* \*